US009127163B2

(12) United States Patent
Limerkens et al.

(10) Patent No.: US 9,127,163 B2
(45) Date of Patent: Sep. 8, 2015

(54) POLYISOCYANATE-BASED BINDER

(75) Inventors: Dominicus Limerkens, Meeuwen-Gruitrode (BE); Marc Broekaert, Zottegem (BE); Stefan Priemen, Sint Truiden (BE)

(73) Assignee: Huntsman International LLC, The Woodlands, TX (US)

( * ) Notice: Subject to any disclaimer, the term of this patent is extended or adjusted under 35 U.S.C. 154(b) by 148 days.

(21) Appl. No.: 13/988,808

(22) PCT Filed: Nov. 24, 2011

(86) PCT No.: PCT/EP2011/070965
§ 371 (c)(1),
(2), (4) Date: May 22, 2013

(87) PCT Pub. No.: WO2012/072496
PCT Pub. Date: Jun. 7, 2012

(65) Prior Publication Data
US 2013/0245164 A1    Sep. 19, 2013

(30) Foreign Application Priority Data

Nov. 29, 2010    (EP) .................... 10192965

(51) Int. Cl.
*B05D 3/02* (2006.01)
*B32B 23/00* (2006.01)
(Continued)

(52) U.S. Cl.
CPC . *C08L 97/02* (2013.01); *B05D 3/02* (2013.01); *B29B 11/16* (2013.01); *B32B 23/00* (2013.01); *B32B 27/00* (2013.01); *B32B 27/40* (2013.01); *C03C 25/32* (2013.01); *C08G 18/00* (2013.01); *C08G 18/0804* (2013.01); *C08G 18/089* (2013.01); *C08G 18/0819* (2013.01); *C08G 18/0823* (2013.01); *C08G 18/0866* (2013.01); *C08G 18/09* (2013.01); *C08G 18/092* (2013.01); *C08G 18/16* (2013.01); *C08G 18/18* (2013.01); *C08G 18/225* (2013.01); *C08G 18/3203* (2013.01); *C08G 18/40* (2013.01); *C08G 18/4208* (2013.01); *C08G 18/4277* (2013.01); *C08G 18/48* (2013.01); *C08G 18/4829* (2013.01); *C08G 18/4833* (2013.01); *C08G 18/706* (2013.01); *C08G 18/7664* (2013.01); *C08G 18/79* (2013.01); *C08G 18/791* (2013.01); *C08J 3/00* (2013.01); *C08J 3/03* (2013.01); *C08J 3/05* (2013.01); *C08J 3/20* (2013.01); *C08J 5/04* (2013.01); *C08J 5/121* (2013.01); *C08J 5/124* (2013.01); *C08J 5/127* (2013.01); *C08K 3/00* (2013.01); *C08K 3/0033* (2013.01); *C08K 5/00* (2013.01); *C08K 5/0025* (2013.01); *C08K 5/09* (2013.01); *C08K 5/098* (2013.01); *C08K 7/02* (2013.01); *C08K 7/04* (2013.01); *C08L 75/04* (2013.01); *C08L 75/06* (2013.01); *C08L 75/08* (2013.01); *C09J 175/04* (2013.01); *C09J 175/06* (2013.01); *C09J 175/08* (2013.01); *C08J 2375/04* (2013.01); *C08J 2375/06* (2013.01); *C08J 2375/08* (2013.01); *C08L 2201/50* (2013.01); *C08L 2201/52* (2013.01); *C08L 2201/54* (2013.01); *C08L 2203/12* (2013.01); *C08L 2312/00* (2013.01); *C09J 2497/008* (2013.01)

(58) Field of Classification Search
CPC .......... B05D 3/02; B29B 11/16; B32B 23/00; B32B 27/00; B32B 27/40; C08G 18/00; C08G 18/0804; C08G 18/0819; C08G 18/089; C08G 18/09; C08G 18/092; C08G 18/16; C08G 18/18; C08G 18/225; C08G 18/3203; C08G 18/40; C08G 18/4208; C08G 18/4277; C08G 18/48; C08G 18/4829; C08G 18/4833; C08G 18/706; C08G 18/7664; C08G 18/79; C08G 18/791; C08G 18/0823; C08G 18/0866; C08J 3/00; C08J 3/03; C08J 3/05; C08J 3/20; C08J 5/04; C08J 5/121; C08J 5/124; C08J 5/127; C08J 2375/04; C08J 2375/06; C08J 2375/08; C08K 3/00; C08K 3/0033; C08K 5/00; C08K 5/0025; C08K 5/09; C08K 5/098; C08K 7/02; C08K 7/04; C08L 75/04; C08L 75/06; C08L 97/02; C08L 2201/50; C08L 2201/52; C08L 2201/54; C08L 2203/12; C08L 2312/00; C09J 175/04; C09J 175/06; C09J 175/08; C09J 2497/008; C03C 25/32; C03C 25/326
USPC .......... 156/331.4; 427/372.2, 385.5; 428/361, 428/393, 394, 423.1, 425.1; 523/200, 205; 524/72, 73, 589, 590, 591, 839, 840; 525/418, 440.01, 450, 454, 460; 528/44, 49, 54, 55, 57, 59, 66, 77, 85
See application file for complete search history.

(56) References Cited

U.S. PATENT DOCUMENTS

| 4,190,459 | A | 2/1980 | Welte et al. |
| 4,904,522 | A | 2/1990 | Markusch |

(Continued)

FOREIGN PATENT DOCUMENTS

| DE | 2753939 | 6/1979 |
| EP | 0018061 | 10/1980 |

(Continued)

*Primary Examiner* — Patrick Niland
(74) *Attorney, Agent, or Firm* — Robert A. Diaz

(57) ABSTRACT

Aqueous binder composition comprising an organic emulsifiable polyisocyanate, an aromatic polyester polyol and a alkali metal salt of a carboxylic acid as trimerisation catalyst and its use for bonding mineral fibre or lignocellulosic material.

17 Claims, No Drawings

(51) Int. Cl.

| | |
|---|---|
| *B32B 27/00* | (2006.01) |
| *B32B 27/40* | (2006.01) |
| *B60C 1/00* | (2006.01) |
| *C08K 5/13* | (2006.01) |
| *C08K 9/00* | (2006.01) |
| *C08F 20/00* | (2006.01) |
| *C08F 283/00* | (2006.01) |
| *C08F 283/04* | (2006.01) |
| *C08G 18/00* | (2006.01) |
| *C08G 18/08* | (2006.01) |
| *C08G 18/10* | (2006.01) |
| *C08G 18/16* | (2006.01) |
| *C08G 18/20* | (2006.01) |
| *C08G 18/28* | (2006.01) |
| *C08G 63/00* | (2006.01) |
| *C08G 63/08* | (2006.01) |
| *C08G 63/91* | (2006.01) |
| *C08G 73/00* | (2006.01) |
| *C08L 67/00* | (2006.01) |
| *C08L 75/00* | (2006.01) |
| *C08L 97/00* | (2006.01) |
| *C08L 99/00* | (2006.01) |
| *C09J 175/06* | (2006.01) |
| *C09J 197/00* | (2006.01) |
| *C08L 97/02* | (2006.01) |
| *B29B 11/16* | (2006.01) |
| *C08G 18/48* | (2006.01) |
| *C08G 18/18* | (2006.01) |
| *C08G 18/32* | (2006.01) |
| *C08G 18/40* | (2006.01) |
| *C08G 18/09* | (2006.01) |
| *C08J 5/12* | (2006.01) |
| *C08G 18/76* | (2006.01) |
| *C08J 3/20* | (2006.01) |
| *C08K 5/098* | (2006.01) |
| *C08K 5/00* | (2006.01) |
| *C08K 3/00* | (2006.01) |
| *C09J 175/04* | (2006.01) |
| *C08K 5/09* | (2006.01) |
| *C08J 5/04* | (2006.01) |
| *C08G 18/79* | (2006.01) |
| *C08J 3/03* | (2006.01) |
| *C08J 3/00* | (2006.01) |
| *C08L 75/04* | (2006.01) |
| *C08K 7/04* | (2006.01) |
| *C08J 3/05* | (2006.01) |
| *C08K 7/02* | (2006.01) |
| *C09J 175/08* | (2006.01) |
| *C03C 25/32* | (2006.01) |
| *C08G 18/22* | (2006.01) |
| *C08G 18/70* | (2006.01) |
| *C08G 18/42* | (2006.01) |
| *C08L 75/06* | (2006.01) |
| *C08L 75/08* | (2006.01) |

(56) References Cited

U.S. PATENT DOCUMENTS

| | | | |
|---|---|---|---|
| 5,071,939 | A | 12/1991 | Fukami et al. |
| 5,157,074 | A | 10/1992 | Metzger et al. |
| 5,185,200 | A | 2/1993 | Tirpak et al. |
| 5,364,897 | A | 11/1994 | Knight et al. |
| 5,372,875 | A | 12/1994 | Markusch et al. |
| 2008/0139775 | A1 | 6/2008 | Wu et al. |
| 2009/0005517 | A1 | 1/2009 | Bleys et al. |
| 2009/0304938 | A1 | 12/2009 | Gurke et al. |

FOREIGN PATENT DOCUMENTS

| | | |
|---|---|---|
| EP | 0741153 | 11/1996 |
| GB | 1444933 | 8/1976 |
| GB | 1523601 | 9/1978 |
| GB | 2018796 | 10/1979 |

POLYISOCYANATE-BASED BINDER

CROSS-REFERENCE TO RELATED APPLICATIONS

This application is the National Phase of International Application PCT/EP2011/070965 filed Nov. 24, 2011 which designated the U.S, and which claims priority to European App. Serial No. 10192965.1 filed Nov. 29, 2010. The noted applications are incorporated herein by reference.

The present invention relates to a composition suitable for use as a binder for lignocellulosic material or mineral fibers, i.e. man made vitreous fibres (MMVF), for example glass slag or stone wool, i.e. mineral wool, a process for providing such a composition, a product provided with such a binder and the use of said composition as a binder for mineral fibre or lignocellulosic material.

Mineral wool products generally comprise mineral fibres bonded together by a cured thermoset polymeric material. One or more streams of molten glass, slag or stone wool are drawn into fibres and blown into a forming chamber where they are deposited as a web onto a travelling conveyor. The fibres, while airborne in the forming chamber and while still hot are sprayed with a binder. The coated fibrous web is then transported from the chamber to a curing oven (150 to 320° C.) where heated air is blown through the mat to cure the binder and rigidly bond the mineral wool fibres together.

Phenol-formaldehyde binders are widely used in the mineral wool industry since they have a low viscosity in the uncured state, yet still form a rigid thermoset polymeric matrix for the mineral fibres when cured. However the use of phenol-formaldehyde binders is becoming increasingly undesirable due to the use and release of environmentally unfavourable chemicals during the process. During application and curing of the binders, after provision thereof to the mineral fibres, phenol, formaldehyde and ammonia are released. In general 20 to 30% of the applied phenol-formaldehyde binder is lost during the evaporation of water in the cooling down of the spun fibres and during the drying/curing of the mats in the oven; these end up in the condensated waste water stream that then needs to be cleaned.

It is also known, from U.S. Pat. No. 4,904,522, to use aqueous dispersions of polyisocyanates as binders for fiberglass. When compared to known phenol/formaldehyde resins, the polyisocyanate binders cure at a much lower temperature, do not split off volatile monomers, provide at least the same strength and are not a potential formaldehyde source.

However, the polyisocyanate binders disclosed in U.S. Pat. No. 4,904,522 have relatively high quantities of unmodified monomeric diisocyanates. Because the presence of monomeric diisocyanates may lead to industrial hygiene problems, it would be beneficial to reduce the content of monomeric diisocyanates as much as possible.

Another deficiency of the polyisocyanate binders disclosed in U.S. Pat. No. 4,904,522 is that it is difficult to achieve complete cure during subsequent heating of the fiberglass mats in the oven zone. During the production of fiberglass mats, the fibers are treated with the aqueous polyisocyanate binders and continuously run through an oven zone in order to evaporate water and to cure the polyisocyanate resins. When aqueously dispersed polyisocyanates are used as binders, the water serves as the co-reactant for the isocyanate groups to foam polyureas. If the isocyanate content of the polyisocyanate binder is too high, water is evaporated in the oven zone before the reaction is complete and as a result, an uncured, unusable fiberglass mat is obtained.

A further disadvantage is that even though the preferred polyisocyanates of U.S. Pat. No. 4,904,522, i.e., polyphenyl polymethylene polyisocyanates, exhibit a low vapor pressure at ambient temperature, they still contain high amounts (as much as 70 wt %) of monomeric diphenyl methane diisocyanates. Upon exposure to the high temperatures in the oven zone these monomeric diisocyanates can be volatilized which results in high concentrations in the exhaust gases. This represents an environmental hazard if these exhaust gases escape into the atmosphere of the workplace or the air surrounding the manufacturing facility.

One method to avoid uncured polyisocyanate binders is to incorporate catalysts which promote the isocyanate/water reaction in the aqueously dispersed polyisocyanate binders. However, this method also does not result in a complete cure of the polyisocyanate prior to evaporation of water in the oven zone and/or provide products of unacceptably low strength.

Accordingly, it is an object of the present invention to provide binders which overcome the deficiencies of the previously described binders.

According to the present invention a binder composition is provided comprising an organic polyisocyanate, an isocyanate-reactive compound and an isocyanate-trimerisation promoting catalyst. Said composition can be used for bonding mineral fibre or lignocellulosic material.

By using the binder composition of the present invention, release of isocyanate into the environment while curing at elevated temperature is strongly reduced and almost no unreacted isocyanate is left in the finished product. The isocyanate-reactive compound reacts with the isocyanate and increases the molecular weight of the resin thereby preventing evaporation. Further the trimerisation catalyst level is tuned to get improved reaction.

Further formaldehyde emissions are considerably reduced.

The fibreglass matt can cure faster thereby leading to increased production capacity without major investments. Faster production is obtained at lower cure temperatures thereby leading to energy conservation.

The structural strength of the mineral wool products bound with the binder of the present invention is increased vis-à-vis prior art products, which provides the option to reduce the resin loading while obtaining the same properties.

U.S. Pat. No. 5,372,875 describes a process for the preparation of an aqueous two-component polyurethane-forming composition by a) dispersing in water a polyisocyanate which has an isocyanate content of at least 12 wt % and b) also blending with water either before, during or after dispersing the polyisocyanate, a polyhydroxyl compound which i) has a molecular weight of 62 to 10000, ii) contains at least two hydroxyl groups, iii) is water soluble or water dispersible, iv) does not contain urea or urethane groups and v) is selected from the group of polyesters, polylactones, polycarbonates, polyethers, polythioethers, polyacetals, polyether esters, polyester amides and polyamides, wherein the equivalent ratio of isocyanate groups to hydroxyl groups is 0.8:1 to 6:1. The polyurethane-forming composition prepared by this process can be used as a binder for fiberglass.

U.S. Pat. No. 5,372,875 mentions addition of catalysts that promote the isocyanate-hydroxyl reaction but is silent in respect of adding catalysts that promote the trimerisation of isocyanate.

Suitable polyisocyanates for use in preparing the polyisocyanates to be dispersed in water in accordance with the present invention include the known aliphatic, cycloaliphatic, araliphatic, aromatic and heterocyclic polyisocyanates.

The nature of the polyisocyanates used as binder is not critical, although they should have a high boiling point such that they do not evaporate to any significant extent at 100° C. This prevents significant quantities of the binder from volatilizing and being present in the exhaust gases during application of hardening of the adhesive, as is the case with conventional phenol-formaldehyde resins.

Preferably, prior to being dispersed in water, the polyisocyanates have an isocyanate content of at least 12%, preferably at least about 15% and more preferably at least about 20% or even at least about 30% by weight, based on the weight of the polyisocyanate. Polyisocyanates having a lower isocyanate content and prepared, e.g., by reacting a monomeric polyisocyanate with a high molecular weight polyol, have sufficiently high viscosities such that it is difficult to disperse them in water even if they are hydrophilically modified.

Examples of suitable monomeric polyisocyanates include 1,6-hexamethylene diisocyanate, 1,12-dodecane diisocyanate, cyclobutane-1,3 -diisocyanate, cyclohexane-1,3- and/or -1,4-diisocyanate, 1-isocyanato-3 ,3 ,5 -trimethyl-5-isocyanatomethyl cyclohexane (isophorone diisocyanate), 2,4- and/or 2,6-hexahydrotoluylene diisocyanate, hexahydro-1,3- and/or -1,4-phenylene diisocyanate, perhydro-2,4'- and/or -4,4'-diphenylmethane diisocyanate, 1,3-and/or 1,4-phenylene diisocyanate, 2,4- and/or 2,6-toluylene diisocyanate, diphenylmethane-2,4'- and/or -4,4'-diisocyanate, naphthalene-1,5-diisocyanate, triphenylmethane-4,4',4"-triisocyanate and polyphenyl polymethylene polyisocyanates obtained by phosgenating aniline/formadehyde condensation products.

Also suitable are polyisocyanates adducts containing urea, biuret, urethane, allophanate, uretdione or carbodiimide groups or isocyanurate rings. These adducts may be prepared from any known monomeric polyisocyanates, especially those set forth above, by known methods. When using low molecular weight, highly volatile diisocyanates, it is especially preferred to convert these diisocyanates into adducts with lower monomeric diisocyanate contents prior to dispersing them in water.

It is also possible to use mixtures of any of these monomeric polyisocyanates and/or polyisocyanates adducts.

In general, it is particularly preferred to use readily available polyisocyanates such as polyphenyl polymethylene polyisocyanates ("crude MDI" or "polymeric MDI") and polyisocyanate adducts containing carbodiimide groups, urethane groups, allophonate groups, isocyanurate groups, uretdione groups or biuret groups, especially those based on 2,4- and/or 2,6-toluylene diisocyanate ("TDI"), 1,6-hexamethylene diisocyanate, isophorone diisocyanate and mixtures thereof.

The polyisocyanates or polyisocyanate adducts used to prepare the binder compositions of the present invention may be used in their unmodified, hydrophobic form or preferably they are rendered hydrophilic by admixture with external emulsifiers or by reaction with cationic, anionic and/or nonionic compounds containing isocyanate-reactive groups. The reaction components which ensure the dispersibility of the polyisocyanates include compounds containing lateral or terminal, hydrophilic ethylene oxide units and compounds containing ionic groups or potential ionic groups.

The compounds containing lateral or terminal, hydrophilic ethylene oxide units contain at least one, preferably one, isocyanate-reactive group and are used in an amount sufficient to provide a content of hydrophilic ethylene oxide units of up to about 40 wt %, preferably about 5 to 40 wt % and more preferably about 10 to 35 wt %, based on the weight of the polyisocyanate. The compounds containing ionic groups or potential ionic groups contain at least one, preferably two, isocyanate-reactive groups and are used in an amount of up to about 120 meq., preferably about 5 to 80 meq., more preferably about 10 to 60 meq. and most preferably about 15 to 50 meq. per 100 g of polyisocyanate.

In addition to the abovementioned hydrophilic modifiers, which are chemically incorporated into the polyisocyanates, it is also possible to use external emulsifiers which may be anionic, cationic or nonionic. Further, when dispersion stability is not a specific requirement, it is possible to disperse the polyisocyanate in water in the absence of emulsifiers by using high shear mixers.

The polyisocyanates used in the present invention preferably have a functionality of at least 2, more preferably at least 2.2. These compounds may be prepared by reacting polyisocyanates having functionalities of greater than 2 with a monofunctional compound containing hydrophilic groups, provided that the average functionality remains at least 2.

Preferred polyisocyanates to be used in the present invention are so-called emulsifiable polyisocyanates, especially emulsifiable MDI, as described in the following patent publications: EP 18061, EP 516361, GB 1523601, GB 1444933, GB 2018796, all incorporated herein by reference.

Such emulsifiable polyisocyanates are commercially available from Huntsman under the tradenames SUPRASEC 1041, SUPRASEC 1042, SUPRASEC 2405, SUPRASEC 2408, SUPRASEC 2419 and RUBINATE 1780 (SUPRASEC and RUBINATE are trademarks from Huntsman LLC).

The water present in the aqueous binder dispersions or emulsions is also used to cool down the fibers when the binder is applied on the fiber production line shortly after the melting/fiberizing.

For the manufacture of higher density panels (density generally above 100 kg/m$^3$ or even above 200 kg/m$^3$) cold fibres are sometimes used and in those circumstances less or no water can be used.

The polyisocyanate dispersions generally have a solids content of about 2 to 100 wt %, preferably about 2 to 96 wt %, more preferably about 5 to 90 wt %.

For the cold fibre process the solids content is generally 50 to 100 wt %, for the hot fibre process it is generally 8 to 50 wt %.

In accordance with the present invention the binder composition also contains one or more polyfunctional isocyanate-reactive compounds which are preferably either water soluble or water dispersible, optionally in the presence of an external emulsifier. The polyfunctional isocyanate-reactive compounds react with the polyisocyanates in a subsequent heating step during which the water is evaporated.

Examples of suitable polyfunctional isocyanate-reactive compounds include polyhydroxyl compounds, polyamines, mercaptans, carboxylic acids, urea and amides.

Suitable polyhydroxyl compounds generally have a molecular weight of 62 to 10000; contain two or more hydroxyl groups; are either water soluble or dispersible in water, optionally in the presence of an external emulsifier; and are selected from polyhydroxyl polyesters, polylactones, polycarbonates, polyethers, polythioethers, polyacetals, polyether esters, polyester amides and polyamides.

The polyhydroxyl compounds are known from polyurethane chemistry and generally have a molecular weight of 400 to 10000, preferably 1000 to 6000. Also suitable are the known low molecular weight polyols having a molecular weight of 32 to less than 400.

An advantage of polyhydroxyl compounds which are rendered water soluble or water dispersible by chemically incorporated emulsifiers over those which are rendered water soluble or dispersible by the use of an external emulsifier is that an extra mixing step is avoided for mixing the emulsifier with the polyhydroxyl compound. Any of the previously mentioned polyhydroxyl compounds may be rendered water soluble or dispersible by the incorporation of polyethylene oxide units, salt (ionic) groups or potential salt (ionic) groups which are subsequently neutralized during their preparation.

Preferred water soluble or water dispersible/emulsifiable polyhydroxyl compounds for use in the present invention are polyester polyols, in particular aromatic polyester polyols. A benefit of using aromatic polyester polyols is that the fire performance of the product bound with the present binder is improved as well. Also aromatic polyester polyols outperform polyether polyols in terms of flexural strength of the final product.

Other suitable polyhydroxyl compounds for use in the present invention include polyether polyols having a relatively high ethylene oxide content, preferably at least 50 or even at least 65 wt % (based on the weight of the polyether polyol) such as the commercially available products Perstorp P3380 (ex Pertsorp Polyol), DALTOCEL F526, F555, F442 and F444 (all ex Huntsman) and also sorbitol initiated polyether polyols such as the commercially available Voranol G2005 (ex Dow).

The polyester polyols for use in the present invention advantageously have an average functionality of about 1.8 to 8, preferably about 1.8 to 5 and more preferably about 2 to 2.5. Their hydroxyl number values generally fall within a range of about 15 to 750, preferably about 30 to 550 and more preferably about 200 to 550 mg KOH/g. Preferably the polyester polyols have an acid number between 0.1 and 20 mg KOH/g; in general the acid number can be as high as 90 mg KOH/g.

The polyester polyols can be prepared by known procedures from a polycarboxylic acid or acid derivative, such as an anhydride or ester of the polycarboxylic acid, and any polyol component. The polyacid and/or polyol components may be used as mixture of two or more compounds in the preparation of the polyester polyols.

The polyols can be aliphatic, cycloaliphatic, aromatic and/or heterocyclic. Low molecular weight aliphatic polyhydric alcohols, such as aliphatic dihydric alcohols having no more than about 20 carbon atoms are highly satisfactory. The polyols optionally may include substituents which are inert in the reaction, for example, chlorine and bromine substituents, and/or may be unsaturated. Suitable amino alcohols, such as, for example, monoethanolamine, diethanolamine, triethanolamine, or the like may also be used. A preferred polyol is a glycol. The glycols may contain heteroatoms (e.g. thiodiglycol) or may be composed solely of carbon, hydrogen and oxygen. They are advantageously simple glycols of the general formula $C_nH_{2n}(OH)_2$ or polyglycols distinguished by intervening ether linkages in the hydrocarbon chain, as represented by the general formula $C_nH_{2n}O(OH)_2$. Examples of suitable polyhydric alcohols include: ethylene glycol, propylene glycol-(1,2) and -(1,3), butylene glycol-(1,4) and -(2,3), hexanediol-(1,6), octanediol-(1,8), neopentyl glycol, 1,4-bishydroxymethyl cyclohexane, 2-methyl-1,3-propane diol, glycerin, trimethylolethane, hexanetriol-(1,2,6), butanetriol-(1,2,4), quinol, methyl glucoside, triethyleneglycol, tetraethylene glycol and higher polyethylene glycols, dipropylene glycol and higher polypropylene glycols, diethylene glycol, glycerol, pentaerythritol, trimethylolpropane, sorbitol, mannitol, dibutylene glycol and higher polybutylene glycols. Especially suitable polyols are alkylene glycols and oxyalkylene glycols, such as ethylene glycol, diethylene glycol, dipropylene glycol, triethylene glycol, tripropylene glycol, tetraethylene glycol, tetrapropylene glycol, trimethylene glycol, tetramethylene glycol and 1,4-cyclohexanedimethanol (1,4-bis-hydroxymethylcyclohexane). The polycarboxylic acid component may be aliphatic, cycloaliphatic, aromatic and/or heterocyclic and may optionally be substituted, for example, by halogen atoms and/or may be unsaturated. Examples of suitable carboxylic acids and derivatives thereof for the preparation of the polyester polyols include: oxalic acid, malonic acid, adipic acid, glutaric acid, succinic acid, pimelic acid, suberic acid, azelaic acid, sebacic acid, phthalic acid, phthalic acid anhydride, terephthalic anhydride, isophthalic acid, terephthalic acid, trimellitic acid, tetrahydrophthalic acid anhydride, pyromellitic dianhydride, hexahydrophthalic acid anhydride, tetrachlorophthalic acid anhydride, endomethylene tetrahydrophthalic anhydride, glutaric acid anhydride, maleic acid, maleic acid anhydride, terephthalic acid dimethylester, terephthalic acid-bis glycol ester, fumaric acid, dibasic and tribasic unsaturated fatty acids optionally mixed with monobasic unsaturated fatty acids, such as oleic acids.

While the polyester polyols can be prepared from substantially pure reactant materials, more complex ingredients can be used, such as the side-stream, waste or scrap residues from the manufacture of phthalic acid, terephthalic acid, dimethyl terephthalate, polyethylene terephthalate, and the like. These compositions can be converted by reaction with polyols to polyester polyols through conventional transesterification or esterification procedures.

The production of the polyester polyols is accomplished by simply reacting the polycarboxylic acid or acid derivatives with the polyol component in a known manner until the hydroxyl and acid values of the reaction mixture fall in the desired range. After transesterification or esterification the reaction product can optionally be reacted with an alkylene oxide.

The term "polyester polyol" as used herein includes any minor amounts of unreacted polyol remaining after the preparation of the polyester polyol and/or unesterified polyol (e.g. glycol) added after the preparation. The polyester polyol can advantageously include up to about 40 wt % free glycol. Preferably the free glycol content is from 2 to 30, more preferably from 2 to 15 wt % of the total polyester polyol component.

In an aliphatic polyester polyol both the polyol and the polycarboxylic acid used to make the polyester polyol are aliphatic compounds. However some of the polyol or the polycarboxylic acid may be of aromatic nature; the aromaticity of the aliphatic polyester polyol (expressed as wt % of groups containing at least one aromatic ring per molecule) being below 50%.

In an aromatic polyester polyol at least one of the polyol or the polycarboxylic acid, preferably the acid, is an aromatic compound and the aromaticity is at least 50%. Polyester polyols whose acid component advantageously comprises at least 30 wt % of phthalic acid (or isomers thereof) residues are particularly useful. Preferably the aromaticity of the aromatic polyester polyol is between 70 and 90%.

Preferred aromatic polyester polyols for use in the present invention include STEPANPOL PS2352, PS3152 and PS1752, all commercially available from Stepan; Hoopol F-1394, F-3362, F-4361, F-4396 and F-7021, all commercially available from Syntesia; and Isoexter 3061, 3557 and 4404, all commercially available from Coim.

The polyhydroxyl compounds are added to the binder compositions in an amount which is sufficient to provide an equivalent ratio of isocyanate groups to hydroxyl groups (not taking into account the hydroxyl groups of water) of 2:1 to 30:1, preferably 5:1 to 10:1.

According to the present invention it is advantageous to include a catalyst that promotes the isocyanate trimerisation reaction. The catalyst may be added preferably to the polyhydroxyl composition or the dispersing water.

The addition of such a catalyst is especially advantageous when all the water has evaporated in the curing stage and unreacted monomer is still present. The remaining monomer can then react to form polyisocyanurates, leading to full cure of the binder. This reaction will also reduce quickly the presence of unreacted monomeric polyisocyanates which can volatilize upon exposure to the high temperatures in the curing oven.

Incorporation of catalysts which promote the isocyanate/water reaction (as described in U.S. Pat. No. 5,372,875) to avoid remaining monomer does not result in a complete cure of the polyisocyanate binder prior to evaporation of water in the oven zone. Furthermore, addition of larger amounts of isocyanate/water reaction catalysts will result in preliminary cure of the binder, before the mat formation stage. Also the strength of the bound product is not satisfactory.

Any compound that catalyses the isocyanate trimerisation reaction (isocyanurate-formation) can be used as trimerisation catalyst in the present invention, such as tertiary amines, triazines and most preferably metal salt trimerisation catalysts.

A particularly preferred group are alkali metal salts of organic carboxylic acids, such as potassium acetate (commercially available as Polycat 46 (ex Air Products) and Catalyst LB (ex Huntsman)) or potassium 2-ethylhexanoate (commercially available as Dabco K15 (ex Air Products)), since these do not promote the isocyanate/water reaction as much as amine containing catalysts. Excessive isocyanate/water reaction will lead to preliminary cure.

The trimerisation catalysts are generally used in a quantity of from 0.001 to 10% by weight, based on the total binder formulation with the exclusion of water, preferably from 0.1 to 5 wt %, most preferably 0.5 to 2.0 wt %.

In addition to the trimerisation promoting catalyst a catalyst to control the curing of the polyurethane can be added. But in preferred embodiments such a catalyst is not present.

Examples of such suitable catalysts are those known per se and include tertiary amines, such as triethyl-, tripropyl-, tributyl- and triamylamine, N-methyl morpholine, N,N-dimethyl cyclohexylamine, N,N-dimethyl benzylamine, 2-methyl imidazole, pyrimidine, dimethylaniline and triethylene diamine. Examples of tertiary amines containing isocyanate-reactive hydrogen atoms are triethanolamine and N,N-dimethyl ethanolamine. Other suitable catalysts are silaamines having carbon-silicon bonds and nitrogen-containing bases such as tetraalkyl ammonium hydroxides; alkali hydroxides, alkali phenolates and alkali alcoholates.

Organo metallic compounds, especially organo tin compounds, may also be used as catalysts.

According to the present invention, it is also possible to use reaction retarders, for example acids such as hydrochloric acid, organic acids or organic acid halides. Preferred acids are dicarboxylic acids or carboxylic acids containing another isocyanate reactive hydrogen atom apart from the one for the acid group in order to get a functionality of at least 2, in order to function as chain-extenders or cross-linkers. An example of such acid is lactic acid. Lactic acid shifts the activation temperature of the catalyst to higher temperatures thereby avoiding pre-cure of the resin on the fibre before it is being heated in the oven (low density mat) or hot pressed (higher density panel).

These reaction retardants are generally used in amounts ranging from 0.1 to 2% by weight based on the binder composition excluding any water.

To improve the wetting of the fibers, surfactants can be added to reduce the surface tension of the emulsion. Suitable tension active agents are: resin soap, saturated or unsaturated fatty acids, sodium hydroxystearate, lauryl sulfate, alkylbenzenesulfonic acids, linear alkylbenzenesulfonic acids, alkanesulfonates, polyoxyethylene alkyl (phenyl) ethers, polyoxyethylene alkyl (phenyl) ether sulfuric acid esters or its salts, polyoxyethylene alkyl (phenyl) ether phosphoric acid esters or its salts, protein materials, alkenylsulfosuccinic acids, and a-olefin-sulfonates. Other suitable surfactants include, for example polyalkylene oxide derivatives as formed by addition of 10 mol or more of alkylene oxides, such as ethylene oxide and propylene oxide, to aliphatic monohydric alcohols with 6 to 30 carbon atoms in the molecules, such as octadecyl alcohol and stearyl alcohol, or to alicyclic monohydric alcohols with 6 to 30 carbon atoms in the molecules, or to monovalent mercaptans with 6 to 30 carbon atoms in the molecules, such as dodecyl mercaptan, or to alkylphenols with 6 to 30 carbon atoms in the molecules, such as nonylphenol, or to amines with 6 to 30 carbon atoms in the molecules, such as dodecylamine, or to carboxylic acids with 6 to 30 carbon atoms in the molecules, such as lauric acid and stearic acid; alkyl diphenyl ether sulfonates as formed by ether-bonding of two phenyl groups having a sulfonic acid group, which may have an alkyl or alkoxy group as a substituent; various kinds of anionic surfactants; various kinds of cationic surfactants such as alkylamine acetate and alkyltrimethylammonium chloride; various kinds of nonionic surfactants; and various kinds of amphoteric surfactants.

Preferred as surfactants are polyether modified dimethylsiloxanes, most preferably those having a short siloxane chain These surfactants can also be added to the isocyanate to reduce its surface tension, and increase wetting capability after the majority of the water has evaporated.

Such surfactants are used in amounts varying between 0.01 and 1% by weight based on total binder composition excluding water.

Standard binding additives can improve the binder. Examples of such additives include: adhesion promoters such as silanes to improve the adhesion on glass, stabilisers to prevent thermal or UV degradation and surface-active compounds.

The preferred adhesion promotor is aminopropylsilane. This one can be added in the water stream and will react extremely fast with polyisocyanate in the emulsification or dispersion stage. Fillers, such as clay, silicates, magnesium sulfate and pigments, such as titanium oxide, can also be applied, as well as hydrophobising agents such as silanes, fluorine compounds, oils, minerals and silicone oil (reactive or non reactive).

Polyisocyanurate in itself is already more fire-resistant than polyurea or polyurethane, which is an additional advantage of the present invention, but does not limit the use of additional fire retardants.

According to a preferred embodiment the polyhydroxyl compound, trimerisation catalyst and optionally other additives are first added to the water. The polyisocyanate composition, optionally also containing some surfactant is then blended in with the aqueous composition through in-line mixing preferably just prior to the application to the fibers.

A preferred binder composition contains the following ingredients in the following amount ranges:

Emulsifiable MDI : 100 pbw
Surfactant 1 (added to the polyisocyanate composition): 0.1 to 1, preferably 0.5 wt % on binder solids
Water: 0 to 2000 pbw
Trimerisation catalyst: 0.5 to 2.0, preferably 1.5 wt % on binder solids
Adhesion promotor: 0.2 to 2, preferably 0.5 wt % on binders solids
Surfactant 2 (added to the aqueous polyhydroxyl composition): 0.05 to 0.5, preferably 0.2 wt % on water Lactic acid: 0.1 to 2.0, preferably 1.2 wt % on binder solids
Polyester polyol: 20 to 60 pbw The present binder composition can be applied in combination with other binder compositions such as for instance phenol-formaldehyde resins, starch, modified starch, polysaccharides, fufural, acrylics, polyvinylalcohol, cellulose and carboxymethylcellulose.

The present binder composition can be used to bond various materials but is preferably used to bond lignocellulosic material or particularly mineral fibres.

If used to bond mineral fibres the binder composition is preferably sprayed onto the molten glass fibres or rock fibres and subsequently cured at a temperature generally between 150 and 260° C., preferably about 150 to 170° C. One advantage of the present binder composition vis-à-vis prior art binders is that a lower curing temperature can be used which also reduces the probability of resin loss.

The binder solution can be sprayed on the fibres, whereby it is possible to use both peripheral and central sprayers. Since the isocyanate will react with the water in which it is emulsified, the preferred processing way is to mix the two components at the spray nozzle or shortly before to prevent gelling or precipitating reactions.

The binder is generally applied to the fibres in an amount range of 2 to 10%, preferably 4 to 8%, even more preferably 4 to 5% by weight (excluding water) based on the mineral wool fibres.

Other additives commonly used in the manufacturing of mineral wool boards like dusting suppressants, colorants, odorants, fillers, etc. can be added separately or by mixing into one or more of the diluted binder streams.

It is, however, also possible to apply the binder to the mineral wool in a subsequent step of the production of the insulating material, for example by spraying it on the primary web on the conveyor, or even at a later stage. It is also possible to apply an additional binder in such a separate and later stage, thus obtaining a material with improved resistance and/or strength.

It is also possible to distribute the binder on dry, cold fibers in a dry blending process. The binder can then be cured at relatively low temperatures.

The raw materials for fibres composition can be converted to a melt in the conventional manner, for instance in a gas heated furnace or in an electric furnace or in a shaft or cupola furnace. The melt can be converted to fibres in the conventional manner, for instance by a spinning cup process or by a cascade rotor process.

Man made vitreous fibres (MMVF) are made from vitreous melt, such as of stone, slag, glass or other melts. The melt is formed by melting in a furnace a mineral composition having the desired analysis. This composition is generally formed by blending rocks or mineral to give the desired analysis.

The fibres can have any convenient fibre diameter and length. Generally the average fibre diameter is below 10 μm e.g. 5 μm. Usually a mineral wool product contains 1 to 20 wt % dry binder, preferably 1 to 15 wt %, most preferably 2 to 10 wt %. Usually the binder is added to the fibres just after fibersation of the melt. Generally the mineral wool product is in the form of a slab, sheet or other shaped article.

The density of the mineral wool boards made using the binder of the present invention generally lies in the range 5 to 2500 kg/m$^3$, preferably 120 to 1200±150 kg/m$^3$.

Products according to the invention may be formulated for any of the conventional purposes of MMV fibres, for instance, slabs, sheets, pipes or other shaped products that are to serve as thermal insulation, fire insulation and protection or noise reduction and regulation or as horticultural growing media.

The binder can also be used to coat the surface of either the fibres or one or more of the surfaces of the mineral wool product.

The binder composition of the present invention could also find application as an adhesive for glass fibre products.

Another application of the present binder composition is in the bonding of lignocellulosic material.

The lignocellulosic bodies are prepared by bringing the lignocellulosic parts into contact with the binder composition like by means of mixing, spraying and/or spreading the composition with/onto the lignocellulosic parts and by pressing the lignocellulosic parts, preferably by hot-pressing, normally at 80° C. to 300° C., preferably 140° C. to 270° C. and 0.1 to 6 MPa specific pressure.

Such binding processes are commonly known in the art.

In wafer board manufacture the lignocellulosic material and the binder composition may be conveniently mixed by spraying the present binder composition on the lignocellulosic material while it is being agitated.

In medium density fibreboard the lignocellulosic material and the binder composition may be conveniently mixed by spraying the present binder composition on the lignocellulosic material in a blowline as commonly used.

In one manufacturing process the lignocellulosic material after treatment with the binder composition is placed on caul plates made of aluminum or steel which serve to carry the resinated furnish into a press where it is compressed to the desired extent (thickness or density specified) usually at a temperature between 120° C. and 300° C., preferably between 140° C. and 270° C. At the start of a manufacturing run it may be helpful, but not essential, to condition the press platens by spraying their surfaces with an external release agent or to increase the cycle time of the first press load. A preconditioned press may then be used many times in the process of the invention without further treatment.

The process can be used in the manufacture of wafer board also known as oriented strand board, medium density fiberboard, particle board (also known as chipboard), wood fibre insulation panels and plywood.

Thus the lignocellulosic material used can include wood strands, woodchips, wood fibers, shavings, veneers, wood wool, cork, bark, sawdust and like waste products of the wood working industry as well as other materials having a lignocellulosic basis such as paper, bagasse, straw, flax, sisal, bamboo, coconut fibers, hemp, rushes, reeds, rice hulls, husks, grass, nutshells and the like. Additionally, there may be mixed with the lignocellulosic materials other particulate or fibrous materials such as grinded foam waste (for example, grinded polyurethane foam waste), mineral fillers, glass fiber, mica, rubber, textile waste such as plastic fibers and fabrics. These materials may be used in the form of granulates, shavings or chips, fibers, strands, spheres or powder.

When the binder composition is applied to the lignocellulosic material, the weight ratio of binder/lignocellulosic material will vary depending on the bulk density of the lignocellulosic material employed. Therefore, the binder compositions may be applied in such amounts to give a weight ratio of binder/lignocellulosic material in the range of 0.1:99.9 to 25:75 and preferably in the range of 0.5:99.5 to 10:90 and most preferably in the range 2:98 to 8:92 or even 1.5:98.5 to 6:94.

The various aspects of this invention are illustrated, but not limited by the following examples.

In these examples the following ingredients are used:
SUPRASEC 1042: an emulsifiable MDI, available from Huntsman Catalyst LB: alkali metal salt of carboxylic acid trimerisation catalyst, available from Huntsman Dabco K15: alkali metal salt of carboxylic acid trimerisation catalyst, available from Air Products Dabco TMR: quaternary ammonium salt trimerisation catalyst, available from Air Products Jeffcat TR90: amine catalyst, available from Huntsman Stepanpol PS2352: aromatic polyester polyol, hydroxyl number 240, available from Stepan DALTOCEL F526: polyether polyol, hydroxyl number 128, available from Huntsman DALTOCEL F442: polyether polyol, hydroxyl number 42, available from Huntsman DALTOCEL F444: polyether polyol, hydroxyl number 35, available from Huntsman CAPA 2043: caprolactone polyester diol, hydroxyl number 280, available from Perstorp ISOEXTER 3644: brominated aromatic polyester polyol, hydroxyl number 300, available from Coim ISOEXTER 3061: aromatic polyester polyol, hydroxyl number 300, available from Coim Eternacoll BH100: polycarbonate diol, hydroxyl number 116, available from UBE Chemical Europe

EXAMPLES

Binder formulations containing the ingredients as listed in the table below (amounts are indicated as pbw) were prepared. First all additives are added to the water and then this aqueous dispersion is mixed with the polyisocyanate using inline static mixing device.

Curing took place at the temperature indicated in the table. The percentage resin loss was determined by TGA.

Flexural strength of boards with 3% binder loading was measured according to standard DIN 63.

Results are presented in the Table below.

TABLE 1

| | Sample No. | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| SUPRASEC 1042 | 100 | 100 | 100 | 100 | 100 | 100 | 100 | 100 | 100 | 100 | 100 | 100 | 100 | 100 |
| Water | 99.1 | 97.3 | 97.3 | 97.3 | 97.3 | 97.3 | 94.3 | 97.3 | 97.3 | 97.3 | 97.3 | 97.3 | 97.3 | 97.3 |
| Catalyst LB | 0.2 | 1.5 | 1.5 | 1.5 | 1.5 | | | | 1.5 | 1.5 | 1.5 | 1.5 | 1.5 | 1.5 |
| Dabco 15 | | | | | | 1.5 | | | | | | | | |
| Dabco TMR | | | | | | | 4.5 | | | | | | | |
| Jeffcat TR90 | | | | | | | | 1.5 | | | | | | |
| Lactic acid | 0.8 | 1.2 | 1.2 | 1.2 | 1.2 | 1.2 | 1.2 | 1.2 | 1.2 | 1.2 | 1.2 | 1.2 | 1.2 | 1.2 |
| STEPANPOL PS2352 | 0 | 0 | 20 | 0 | 20 | 20 | 20 | 20 | | | | | | |
| DALTOCEL F526 | | | | | | | | | 20 | | | | | |
| DALTOCEL F442 | | | | | | | | | | 20 | | | | |
| DALTOCEL F444 | | | | | | | | | | | 20 | | | |
| CAPA 2043 | | | | | | | | | | | | 20 | | |
| ISOEXTER 3061 | | | | | | | | | | | | | 20 | |
| BH100 | | | | | | | | | | | | | | 20 |
| Curing Temp (° C.) | 260 | 260 | 160 | 160 | 160 | 160 | 160 | 160 | 160 | 160 | 160 | 160 | 160 | 160 |
| Resin lost (%) | 60.9 | 18.4 | 0.8 | 2.7 | 0.6 | 0.5 | 1.0 | 1.0 | 1.9 | 1.0 | 1.0 | 2.3 | 1.7 | 1.6 |
| Flexural strength (MPa) | | 17.2 | 23.9 | 14.5 | 16.9 | 18.0 | 15.6 | 6.4 | 9.1 | 10.8 | | 14.6 | 19.5 | 16.6 |

The invention claimed is:

1. A binder composition comprising:
   an organic polyisocyanate,
   an isocyanate-reactive compound, and
   an isocyanate-trimerisation promoting catalyst,
   wherein the isocyanate-reactive compound comprises an aromatic polyester polyol.

2. The binder composition according to claim 1 wherein the solids content is 2 to 100 wt %.

3. The binder composition according to claim 1, further comprising water.

4. The binder composition according to claim 3 in the form of an aqueous emulsion or dispersion.

5. The binder composition according to claim 1 wherein the polyisocyanate is modified to make it emulsifiable or dispersible.

6. The binder composition according to claim 5 wherein the modification involves reaction with at least one of cationic, anionic, and nonionic compounds containing isocyanate-reactive groups.

7. The binder composition according to claim 1 wherein the polyisocyanate is derived from diphenylmethane diisocyanates (MDI) and/or oligomers thereof.

8. The binder composition according to claim 1 wherein the amount of isocyanate-reactive compound is sufficient to provide an equivalent ratio of isocyanate groups to hydroxyl groups (excluding water) of 2:1 to 30:1.

9. The binder composition according to claim 1 wherein the isocyanate-trimerisation promoting catalyst is an alkali metal salt of a carboxylic acid.

10. The binder composition according to claim 1 wherein the isocyanate-trimerisation promoting catalyst is used in an amount ranging from 0.1 to 5 wt % based on an amount of solids in the binder composition.

11. The binder composition according to claim 1 further comprising at least one of a reaction retarder, a wetting agent, and an adhesion promoter.

12. The binder composition according to claim 11 wherein the reaction retarder is lactic acid.

13. A process for preparing the binder composition of claim 1 comprising the steps of:
   adding the isocyanate-reactive compound and the isocyanate-trimerisation promoting catalyst to water to form an aqueous composition, and
   blending the aqueous composition with the polyisocyanate.

14. A process for providing a bound mineral fiber product, comprising the steps of administerinq a binder composition as defined in claim 1 to the mineral fibers, and curing the binder composition.

15. The process according to claim 14 wherein the curing takes place at a temperature of 150 to 260° C.

16. The process according to claim 14 wherein the binder composition is applied in an amount range of 2 to 10% by weight (excluding water) based on the mineral fibers.

17. A process for providing a bound lignocellulosic product, comprising the step of bringing the lignocellulosic parts into contact with a binder composition as defined in claim 1 and pressing the lignocellulosic parts.

* * * * *